(12) United States Patent
Narayanan et al.

(10) Patent No.: US 8,572,710 B2
(45) Date of Patent: Oct. 29, 2013

(54) PLUGGABLE TOKEN PROVIDER MODEL TO IMPLEMENT AUTHENTICATION ACROSS MULTIPLE WEB SERVICES

(75) Inventors: Ranjith Narayanan, Bellevue, WA (US); Rui Liang, Sammamish, WA (US); Srivatsa Srinivasan, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 685 days.

(21) Appl. No.: 12/726,779

(22) Filed: Mar. 18, 2010

(65) Prior Publication Data

US 2011/0231921 A1 Sep. 22, 2011

(51) Int. Cl.
*H04L 29/06* (2006.01)
(52) U.S. Cl.
USPC ............... 726/9; 713/159; 713/172; 709/225; 709/229
(58) Field of Classification Search
USPC ......... 726/8–10; 713/159, 172; 709/223, 224, 709/225, 229
See application file for complete search history.

(56) References Cited

U.S. PATENT DOCUMENTS

| | | | | |
|---|---|---|---|---|
| 6,006,264 | A * | 12/1999 | Colby et al. .................. | 709/226 |
| 7,516,176 | B2 * | 4/2009 | Potter et al. .................... | 709/201 |
| 8,341,270 | B2 * | 12/2012 | Mazzaferri et al. .......... | 709/227 |
| 8,341,732 | B2 * | 12/2012 | Croft et al. ...................... | 726/21 |
| 8,346,929 | B1 * | 1/2013 | Lai ............................... | 709/226 |
| 8,359,397 | B2 * | 1/2013 | Traversat et al. ............. | 709/230 |
| 8,369,326 | B2 * | 2/2013 | Ansari et al. .................. | 370/389 |
| 2003/0105981 | A1 * | 6/2003 | Miller et al. .................. | 713/202 |
| 2004/0059590 | A1 * | 3/2004 | Mercredi et al. .................. | 705/1 |
| 2005/0268326 | A1 | 12/2005 | Bhargavan et al. | |
| 2005/0273844 | A1 | 12/2005 | Dapkus et al. | |
| 2006/0005234 | A1 * | 1/2006 | Birk et al. ......................... | 726/9 |
| 2006/0123234 | A1 | 6/2006 | Schmidt et al. | |
| 2008/0148345 | A1 | 6/2008 | Rubio | |
| 2008/0263644 | A1 * | 10/2008 | Grinstein ......................... | 726/6 |
| 2008/0301784 | A1 * | 12/2008 | Zhu et al. ......................... | 726/5 |
| 2009/0057396 | A1 | 3/2009 | Barbour et al. | |
| 2009/0259753 | A1 | 10/2009 | Hinton et al. | |
| 2010/0154041 | A1 * | 6/2010 | Dalzell et al. ...................... | 726/6 |

FOREIGN PATENT DOCUMENTS

EP 1895440 A1 3/2008

OTHER PUBLICATIONS

"Java CAPS Secure SOA", Retrieved at <<http://72.5.124.69/download/attachments/31395447/JavaCAPS+6+-+Secure+SOA.pdf?version=1&modificationDate=1221428414000>>, Sep. 2008, pp. 42.
"Oracle® Application Server Web Services Security Guide", Retrieved at <<http://download.oracle.com/docs/cd/B25221_04/web.1013/b15979/intro.htm#WSSEC01000>>, Jan. 18, 2010, pp. 27.

(Continued)

*Primary Examiner* — Amare F Tabor
(74) *Attorney, Agent, or Firm* — Merchant & Gould P.C.

(57) ABSTRACT

A pluggable token provider model for message level authentication across multiple web services is provided. Web service and token provider implementations within a client application are separated from an actual component that operates the business logic to formulate and understand a web request. The web service components may request web services to be executed and supply the body for the web service message while a common framework maintains the web services metadata, which includes definitions associated with respective tokens. The framework may further maintain token provider implementations that actually fetch authentication tokens and perform the web requests.

19 Claims, 6 Drawing Sheets

(56) References Cited

OTHER PUBLICATIONS

Peterson, et al., "Security Concepts, Challenges, and Design Considerations for Web Services Integration", Retrieved at <<https://buildsecurityin.us-cert.gov/daisy/bsi/articles/best-practices/assembly/639-BSI.html>>, Dec. 14, 2006, pp. 24.

"What is New for Security Specialists", Retrieved at <<http://publib.boulder.ibm.com/infocenter/wasinfo/v6r1/index.jsp?topic=/com.ibm.websphere.express.iseries.doc/info/iseriesexp/ae/welc_newsecurity.html>>, Version 6.1, Jan. 13, 2010, pp. 6.

Yunus, et al., "Identity Bridging Techniques across SOA-based Business Service Networks", Retrieved at <<http://www.crosschecknet.com/resources/white_papers/Identity_Bridging_for_SOA_v1.pdf>>, Dec. 19, 2006, pp. 6.

"International Search Report", Mailed Date: Oct. 20, 2011, Application No. PCT/US2011/028509, Filed Date: Mar. 15, 2011, pp. 8.

* cited by examiner

PLUGGABLE TOKEN PROVIDER MODEL TO IMPLEMENT AUTHENTICATION ACROSS MULTIPLE WEB SERVICES

BACKGROUND

As the complexity of a client applications grows, so does the number of web services such applications interact with. Many web services employ authenticated sessions to the server. Some of the standard methods of authentication include using Integrated Windows Authentication (IWA), client certificate based authentication with mutual transport level security (MTLS) and various forms of message level authentications. Web services today are increasingly inclined towards message level authentication using the Web Service Security (WSS) protocol because of its extensibility. A WSS message itself might carry authentication tokens that are derived from Kerberos tickets, X.509 certificates, or XML tokens (e.g., SAML tokens).

Web service implementations may share the authentication token providers. However, the token itself used to authenticate at the message level is typically different because the target name of the web service against which the token is validated may differ. Moreover, the token providers may be standards based, proprietary implementation using a library, or proprietary implementation using a protocol.

Thus, there is no single interface available that provides the ability to consolidate different technologies such that a communications client can easily authenticate with various web services. Furthermore, it is a challenge for enterprise clients—as enterprise and cloud-based services integrate—to operate within an extensible framework that can integrate various web technologies and authenticate with them.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a pluggable token provider model for message level authentication across multiple web services. Web service and token provider implementations within a client application may be separated from an actual component that operates the business logic to formulate and understand a web request. The web service components may request web services to be executed and supply the body for the web service message while a common framework may maintain the web services metadata, which includes definitions associated with respective tokens. The framework may further maintain token provider implementations that actually fetch authentication tokens and perform the web requests.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a pluggable token provider model for message level authentication across multiple web services may be implemented through separation of web service and token provider implementations within a client application from an actual component that operates the business logic to formulate and understand a web request. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing web services and related network communications. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
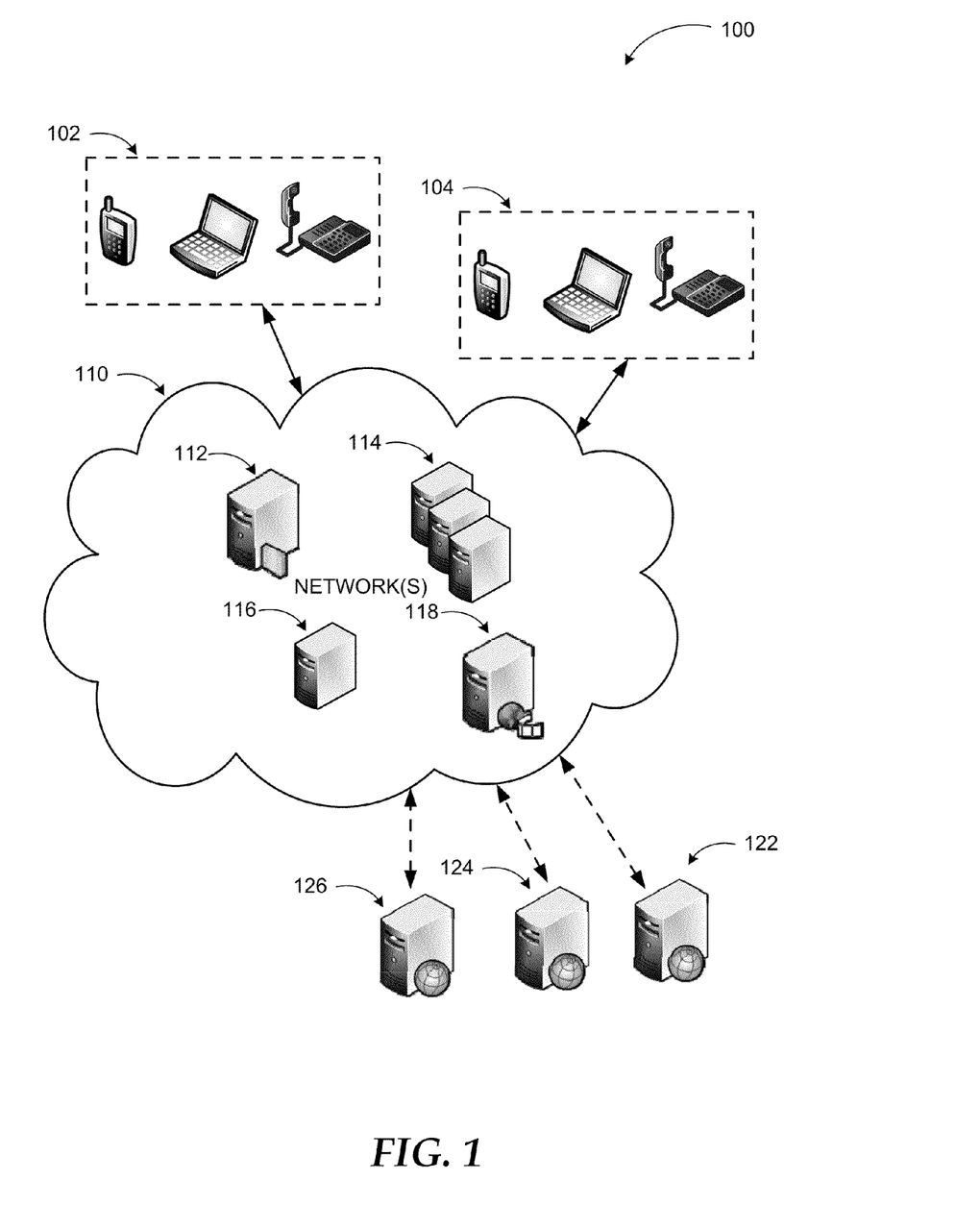
FIG. 1 is a diagram illustrating an example unified communications system, where embodiments may be implemented for message level authentication across web services.

FIG. 1 includes diagram 100 illustrating an example unified communications system, where embodiments may be implemented for message level authentication across web services. A unified communication system is an example of modern communication systems with a wide range of capabilities and services (including web services) that can be provided to subscribers. A unified communication system is a real-time communications system facilitating instant messaging, presence, audio-video conferencing, web conferencing, and similar functionalities.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also execute applications that facilitate various web services such as participation in social networks, web based document sharing, searches, and comparable ones. Furthermore, traditional phone calls and similar communications may also be facilitated by these client devices through an external connection such as through a PBX to a Public Switched Telephone Network ("PSTN"). Client devices may include any type of smart phone, cellular phone, any computing device executing a communication application, a smart automobile console, and advanced phone devices with additional functionality.

UC Network(s) 110 may include a number of servers performing different tasks. For example, UC servers 114 provide registration, presence, and routing functionalities. Routing functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network. Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method.

SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

A UC system may provide a platform for social networking, multimodal enterprise communications, web-based sharing services, and similar environments. When a subscriber participates in such an environment, they may take advantage of web services managed by one or more external servers (e.g., 122, 124, and 126) or by one of the servers internal to the UC system. Some of these services may require credential based authentication. Such services may be facilitated through web service components implemented within each client application. In a system according to embodiments, web service and token provider implementations within a client application may be separated from a web service manager component that manages execution of the web services. The web service manager component may be part of a common framework that maintains the web services metadata, token provider implementations, a credentials manager, and relevant interfaces for performing the web requests. More detailed examples are discussed below.

While the example system in FIG. 1 has been described with specific components such as mediation server, A/V server, and similar devices, embodiments are not limited to these components or system configurations and can be implemented with other system configuration employing fewer or additional components. Functionality of systems employing a pluggable model for message level authentication across multiple web services may also be distributed among the components of the systems differently depending on component capabilities and system configurations. Furthermore, embodiments are not limited to unified communication systems. The approaches discussed here may be applied to any data exchange in a networked communication environment using the principles described herein.

Figure 2:
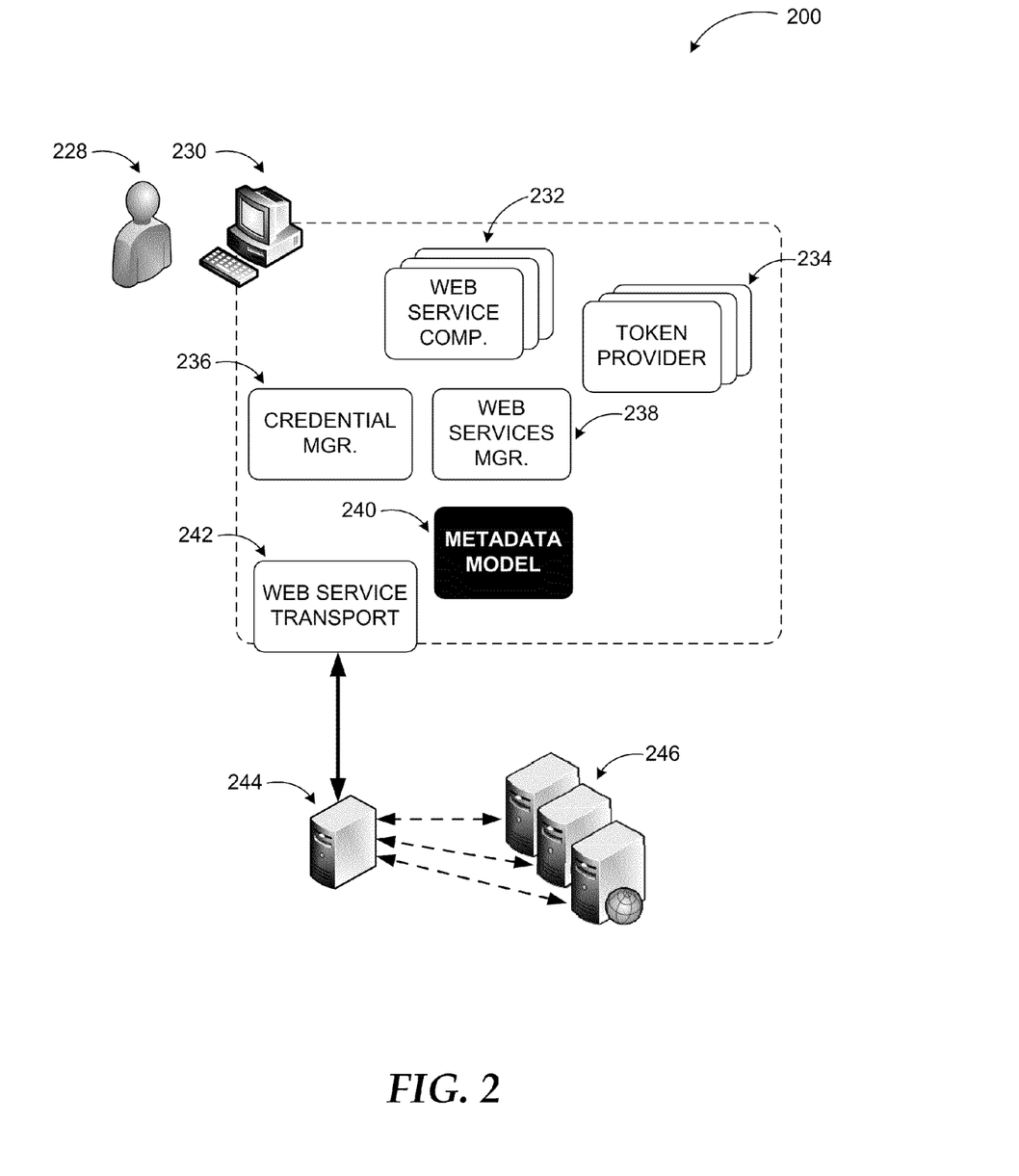
FIG. 2 is a conceptual diagram illustrating various components within a client application and example servers that may be used to implement a pluggable model for message level authentication across web services.

FIG. 2 is a conceptual diagram illustrating various components within a client application and example servers that may be used to implement a pluggable model for message level authentication across web services. In a system according to embodiments, as shown in diagram 200, user 228 may interact with a variety of web service providers through their client 230. Client 230 may refer to a computing device executing one or more applications, an application executed on one or more computing devices, or a service executed in a distributed manner and accessed by user 228 through a computing device. In a typical system client 230 may communicate with one or more servers (e.g., server 244) managing communications within a network of the client. Some of the web services may be provided through resources available on server 244. Other web services may be provided through resources available on servers 246, which may be internal or external to the network.

Token issuers that the client 230 interacts with may be represented by token provider components 234 in the model. The token provider components 234 may be uniquely identified either with their Universal Resource Identifier (URI) or name, in such a way that they can be referenced by the metadata model component 240 by using web service metadata or WSS policy information fetched from web service components 232.

The metadata model component 240 is responsible for maintaining information associated with the web service(s). The metadata may be fetched employing standard mechanisms like WSDL-metadata or WS-MEX. Once the metadata is retrieved, the metadata model component 240 may maintain a mapping of metadata information with the identifier (e.g. Universal Resource Locator "URL") of the web service that supplies the metadata. The metadata model component 240 may also persist the metadata information in a file or similar persistent storage such that a parsing and retrieval cycle is not repeated every time the application starts.

The components implementing and/or consuming web service requests and responses according to embodiments may be ignorant of the underlying token provider and metadata frameworks. These components may simply supply the payload of the web service call to be made (e.g., for the Simple Object Access Protocol "SOAP" body of the web service). Once a particular call is made, the web service manager component 238 may extract the base identifier of the call and call into the metadata model component 240 requesting the web service metadata. Once the metadata is retrieved, the web services manager component 238 may cycle thorough available bindings in the metadata and select an appropriate one based on the requested operation and authentication type depending on credentials provided by credential manager component 236. Then, the token provider call may be made to fetch the token, and the web service manager component 238 may combine these pieces of information to construct an actual web service request (e.g., a SOAP request).

The credential manager component 236 may identify credential services (also known as "Logon Services") with a user identifier. Calls made to the credential manager component 236 by other components implementing the credential service may specify the identifier in the context of which a call is made. The credential manager component 236 may be capable of handling multiple types of credentials. Examples of credentials that may be used in a system according to embodiments include, but are not limited to, username/password, certificates, personal identification numbers, and comparable ones. Credential manager component 236 may query the user for credentials or supply any of the inbuilt credentials in the system. The latter may include credentials of the user logged in to the operating system at that time, which may be fetched by a system call. If the credentials are to be queried, the user interface may be provided with a command to display a prompt. The prompt can be either dismissed by the user by making a cancel actionable or answered by supplying credentials.

Once a credential is supplied to the credential manager component 236, it may be saved in the component's data model for further usage. Saving in the model may be volatile and purged when the application is shutdown or another user logs in to the application. The credentials may be stored in nonvolatile memory following encryption and operating system calls are used for this purpose. For every credential available to the credential manager component 236, the component may maintain a running copy of the success record map between each service (as represented by identifier) and the success record for that service. The success record might be in one of three states: "unknown", "success", or "failure". The "unknown" state may be set when the particular credential has never been used by the credential service. Any future calls to the credential manager from the service may give out this credential. A success record in the "success" state may record the successful usage for the service against a credential and the same may be used by the service until a failure is reported. Further calls into the credential manager component 236 for a successful service's identifier may return the "success" credential. A "failure" state may record a logon failure of the service against a credential. Such a credential may not be used again with the service until the system is reset.

Moreover, the credential manager component 236 may persist credential information across application restarts by using a system resource like the registry, a file, and/or a credential manager Application Programming Interface (API). The credentials may be encrypted for security. Web service transport component 242 may provide communication interface with other applications/services such as those executed on server 244.

For exchanging messages (calls) between components of client 230 and external resources, example protocols such as SOAP and WSS have been mentioned above. SOAP, (Simple Object Access Protocol) is a protocol specification for exchanging structured information in the implementation of web services in computer networks. The protocol utilizes Extensible Markup Language (XML) as its message format and usually relies on other application layer protocols, most notably Remote Procedure Call (RPC) and HTTP for message negotiation and transmission. A SOAP message may include three parts: an envelope—defining what is in the message and how to process it—, a header—containing application related information that is to be processed by SOAP nodes along the message path—, and a body—containing information intended for the ultimate recipient of the message—.

The SOAP architecture includes several layers of specifications for message format, message exchange patterns, underlying transport protocol bindings, message processing models, and protocol extensibility. Web Services Security (WSS) is a flexible and feature-rich extension to SOAP for applying security mechanisms to web services. WSS describes three major mechanisms: how to sign SOAP messages to assure integrity; how to encrypt SOAP messages to assure confidentiality; and how to attach security tokens. The specification allows a variety of signature formats, encryptions algorithms, trust domains, and security token models (e.g., X.509 certificates, Kerberos tickets, user ID/password credentials, SAML-Assertion, and custom defined tokens).

Figure 3:
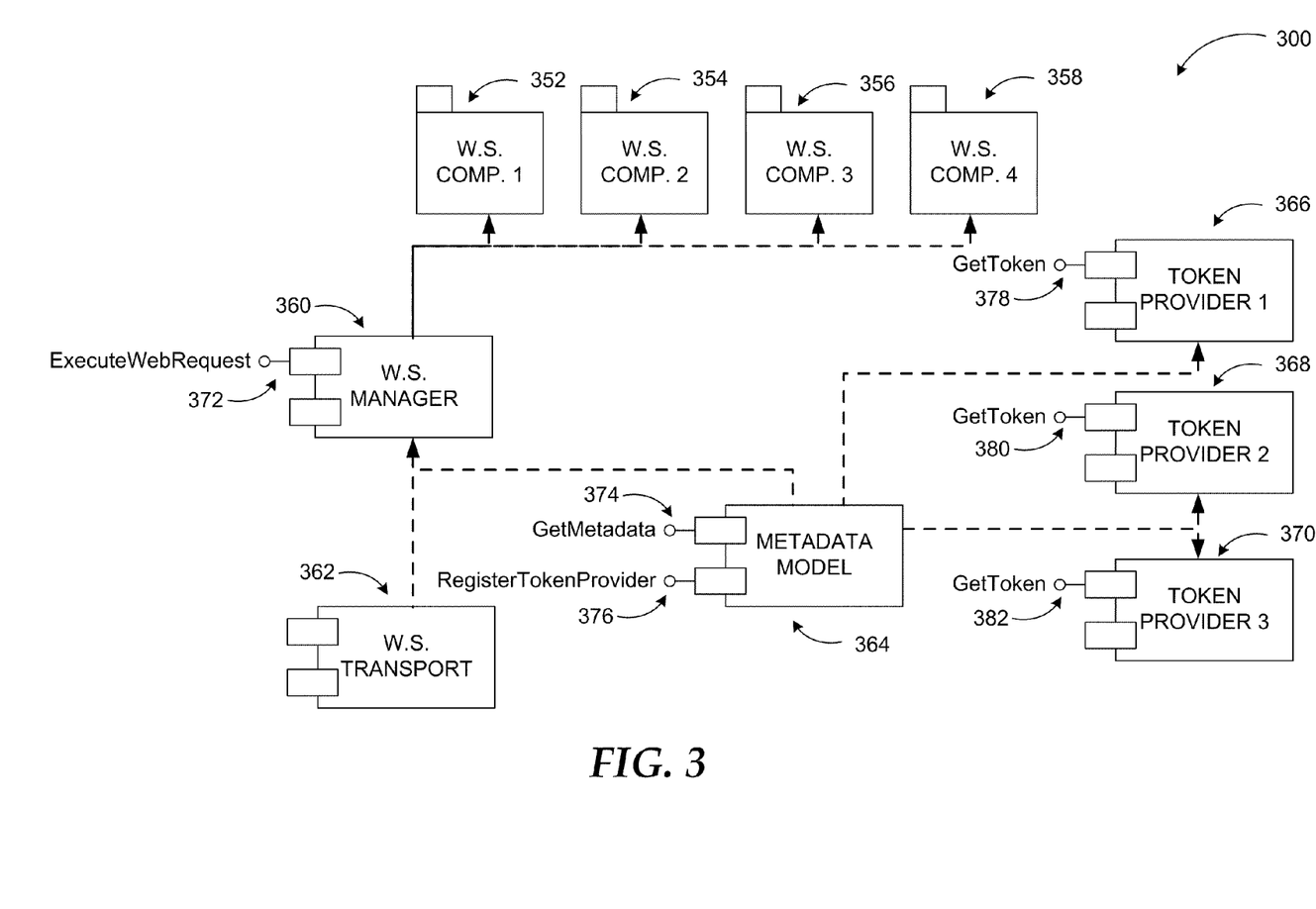
FIG. 3 is a diagram illustrating relevant components, interfaces, and interactions within a client application according to embodiments.

Referring to FIG. 3, diagram 300 illustrating relevant components, interfaces, and interactions within a client application according to embodiments is provided. As discussed previously, token issuers with which the client interacts may be represented by token provider components 366, 368, 370 in the client. The token provider components 366, 368, 370 may be referenced by the metadata model component 364 by using web service metadata or WSS policy information fetched from web service components 352, 354, 356, and 358. As shown in diagram 300, multiple token providers may be implemented by having a generic implementation that can be specialized for particular purposes. In a client application according to some embodiments, token provider components 366, 368, 370 may expose a GetToken( ) interface (378, 380, and 382), which—when supplied with the target for which the token is to be provided—supplies a token corresponding to that target. The tokens may be cached for as long as a token is valid and automatically renewed when calls to the token providers are made after the expiration time. Token provider components 366, 368, 370 may register themselves with the metadata model component 364 by calling into a RegisterTokenProvider( ) interface 376 of the latter. The registration may supply a name (e.g. a unique name) or URI of the token issuer.

The metadata model component 364 is responsible for maintaining information associated with the web service(s). The metadata information may be parsed and maintained as a series of binding entries. Each binding entry may include the actual endpoint URI against which the web service request is to be made, a SOAP operation and action information of the web service, an authentication type supported at the endpoint, security policy information corresponding to the endpoint, and/or a token provider based the token issuer URI in the security policy.

When a GetToken( ) interface (378, 380, 382) call is to be made, the security policy information may be included to support different types of tokens the token provider components may retrieve. For example, the security policy may have an operating environment key that the token provider component may use to actually construct a RequestSecurityToken call to the token issuer. Once the metadata is retrieved, the metadata model component 364 may persist the metadata information in a file or similar persistent storage so that a parsing and retrieval cycle is not repeated every time the application starts.

Web service manager component 360 may receive calls for particular web services through its ExecuteWebRequest( ) interface 372 and extract the base identifier of the call. Web service manager component 360 may then call into the GetMetadata( ) interface 374 of the metadata model component 364 requesting the web service metadata. Once the metadata is retrieved, the web services manager component 360 may cycle thorough available bindings in the metadata and select an appropriate one based on the requested operation and authentication type depending on credentials provided by the credential manager component. This may be followed by a token provider call to fetch a relevant token, and the web service manager component 360 may combine these pieces of information to construct an actual web service request. If no metadata is available at the metadata model component 364 for a particular request, the metadata model component 364 may make a download call to a relevant web service. As discussed previously, web service transport component 362 provides interfacing services between the components within the client and other applications/services executed on other computing devices.

The example systems in FIGS. 1, 2, and 3 have been described with specific servers, client devices, software modules, and interactions. Embodiments are not limited to systems according to these example configurations. A pluggable token provider model for message level authentication across multiple web services may be implemented in configurations employing fewer or additional components and performing other tasks. Furthermore, specific protocols, calls, and interfaces have been discussed in conjunction with describing embodiments above. Embodiments are also not restricted to those examples. Other protocols, exchanges, an interfaces may be implemented in a similar manner using the principles described herein.

Figure 4:
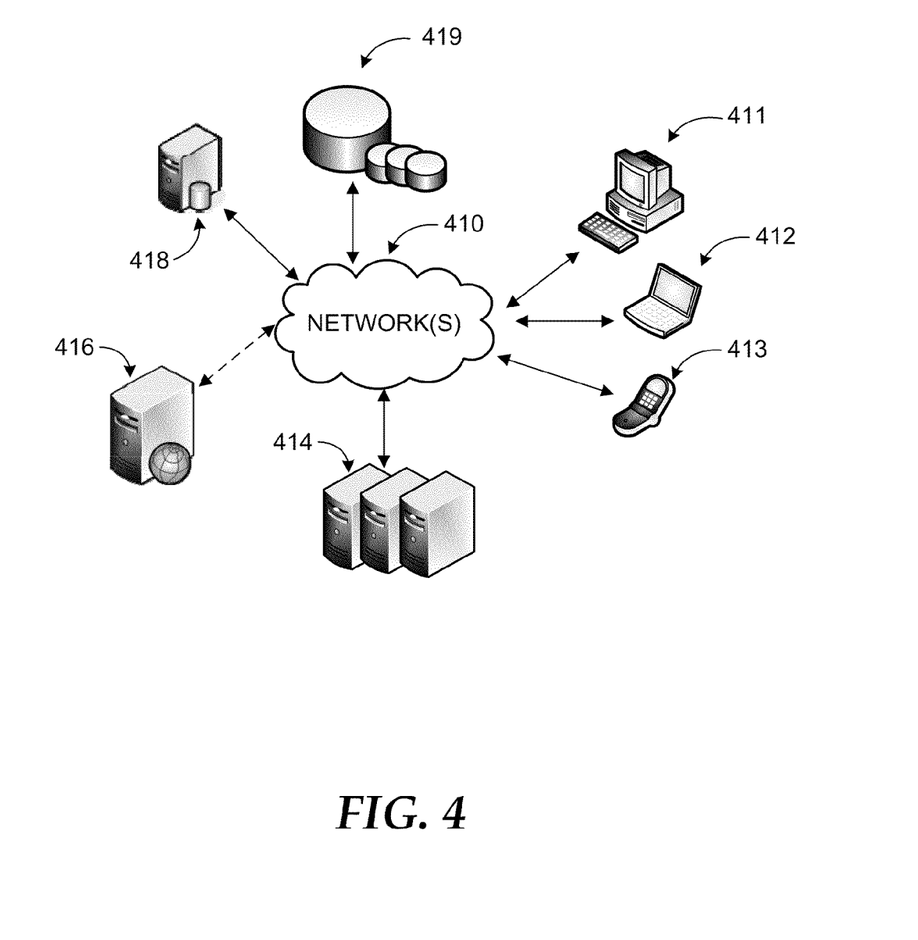
FIG. 4 is a networked environment, where a system according to embodiments may be implemented.

FIG. 4 is an example networked environment, where embodiments may be implemented. A platform providing a pluggable token provider model for authentication across multiple web services may be implemented via software executed over one or more servers 414 such as a hosted service. The platform may communicate with client applications on individual computing devices such as a smart phone 413, a laptop computer 412, or desktop computer 411 (client devices') through network(s) 410.

As discussed above, client applications executed on any of the client devices 411-413 may include separated web service, token provider, web service management, and credential management components. These components may manage authentication for web service requests through a metadata model as explained above. A communication service or application executed on one or more of the servers 414 or single server 416 may receive request(s) from users through client devices 411-413, retrieve relevant data from data store(s) 419 directly or through database server 418, and provide the requested web service to the user(s).

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a framework for message level authentication across multiple web services. Furthermore, the networked environments discussed in FIG. 4 are for illustration purposes only. Embodiments are not limited to the example applications, modules, or processes.

Figure 5:
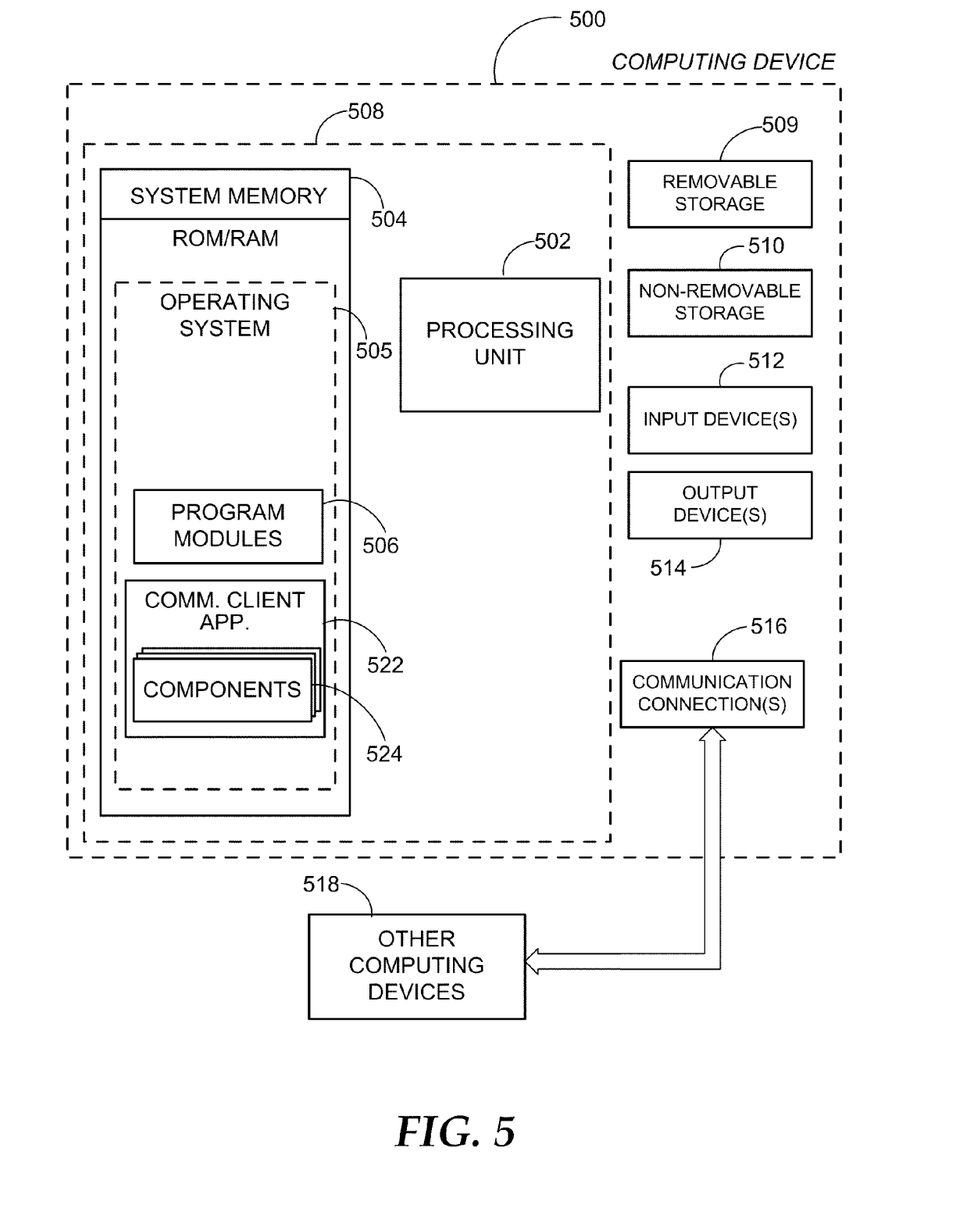
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a client device executing a client application according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, communication client application 522, and components 524.

Communication client application 522 may be any application that facilitates communication between other applications and/or modules on computing device 500 and servers relevant to requested web services. Components 524 may include web service components, token providers, web service managers, credential managers, and metadata models as discussed previously. Web service requests may be performed through message level authentication accomplished through interactions between the components. Communication client application 522 may be separate application or an integral module of a hosted service that provides enhanced communication services to client devices. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, other web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
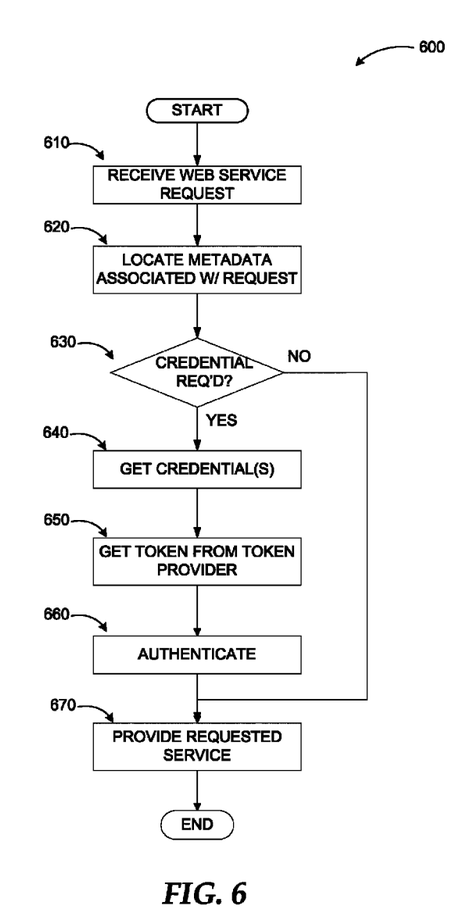
FIG. 6 illustrates a logic flow diagram for a process of providing a web service through message level authentication according to embodiments.

FIG. 6 illustrates a logic flow diagram for a process 600 of providing a web service through message level authentication according to embodiments. Process 600 may be implemented as part of a client application participating in an enhanced communication system.

Process 600 begins with operation 610, where a web service request is received from a web service component within the client application at a web service manager component. The web service manager component may locate metadata associated with the requested web service at operation 620. If the web service manager component determines that credentials are needed at decision operation 630, processing moves to operation 640, where credentials are retrieved from a credential manager component. Otherwise, processing may skip to operation 670, where the requested web service is provided under the management of the web service manager component. The credential manager component may be capable of handling multiple types of credentials through associating a single user identity with multiple web services or associating multiple user identities with a single web service.

At operation 650 following the retrieval of the credential(s), a token associated with the retrieved credential(s) may be requested from a token provider component. Metadata may be configurably processed for fetching tokens on a per-service basis. There may be a token provider component for each web service (per service token provider), where the token provider components and web services are statically bound or dynamically bound. This is followed by operation 660, where the web service manager component oversees authentication of the requested web service based on the received token. If the authentication is successful, the requested web service may be provided at operation 670.

The operations included in process 600 are for illustration purposes. A pluggable token provider model for message level authentication across multiple web services may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for message level authentication across multiple web services through a pluggable token provider model, the method comprising:

receiving a web service request from a local web service component at a client application;

locating metadata associated with the requested web service, wherein the metadata includes information associated with execution and authentication of the requested web service;

parsing the metadata into a plurality of binding entries;

when a credential is associated with the requested web service, retrieving the credential;

based on the credential, selecting an appropriate binding entry from the plurality of binding entries, wherein the plurality of binding entries includes at least one from a set of: a resource identifier against which the web service request is to be made, operation and action information to be included in a web service message, an authentication type supported by the resource, security policy information corresponding to the resource, and a token provider identification based on a token issuer identifier in the security policy;

retrieving a token associated with the retrieved credential;

authenticating the requested web service based on the retrieved token and the selected binding entry; and when the authentication is successful, performing the requested web service.

2. The method of claim 1, wherein web service and token provider components within the client application are separated from a component operating business logic to formulate and understand the requested web service.

3. The method of claim 2, wherein the token provider components represent token issuers interacting with the client application and are identified by one of a Universal Resource Identifier (URI) and a name.

4. The method of claim 3, wherein a metadata model component maintaining metadata references the token provider components employing one of web service metadata and web service security (WSS) policy information retrieved from the web service components.

5. The method of claim 4, wherein the metadata model component further maintains a mapping of metadata information with an identifier of a web service providing the metadata.

6. The method of claim 4, wherein the metadata model component parses the metadata and maintains the plurality of binding entries.

7. The method of claim 4, wherein a web service manager component is configured to:
retrieve the metadata from the metadata model component,
cycle through the plurality of bindings,
select one of the bindings based on the requested web service and associated authentication type, and
construct an actual web service request.

8. The method of claim 7, wherein a credential manager component is configured to identify credential services associated with the requested web service based on a user identifier provided by the web service manager component.

9. The method of claim 6, wherein the metadata model component persists the parsed metadata such that the meta data is retrieved and parsed once.

10. A unified communication system employing message level authentication across multiple web services through a pluggable token provider model, the system comprising:
a server configured to:
manage communications between internal and external resources of the unified communication system and a plurality of client applications;
a client device executing a client application, the client application including:
at least one web service component;
at least one token provider component representing token issuers interacting with the client application;
a metadata model component for retrieving metadata from a web service, wherein the metadata includes information associated with execution and authentication of a requested web service; and
a web service manager component configured to:
retrieve the metadata from the metadata model component,
cycle through a plurality of bindings parsed from the metadata by the metadata model component, wherein the plurality of binding entries includes at least one from a set of: a resource identifier against which the web service request is to be made, operation and action information to be included in a web service message, an authentication type supported by the resource, security policy information corresponding to the resource, and a token provider identification based on a token issuer identifier in the security policy,
select one of the bindings based on the requested web service and associated authentication type, and
construct an actual web service request.

11. The system of claim 10, wherein the client application further includes a credential manager component for identifying credential services based on a user identifier, the credential manager component being capable of handling multiple types of credentials through one of: associating a single user identity with multiple web services and associating multiple user identities with a single web service.

12. The system of claim 11, wherein the multiple web services and the single web service are associated with one of: a resource internal to the unified communication system and a resource external to the unified communication system.

13. The system of claim 11, wherein the credential manager component is configured to save received credentials in volatile memory such that the saved credentials are purged in response to one of the client application shutting down and another user logging in.

14. The system of claim 11, wherein the credential manager is further configured to maintain a success record for each web service, the success record including one of: an "unknown" state for previously unused credentials, a "success" state for successful usage of a web service against a particular credential, and a "failure" state for logon failure of a web service against the particular credential.

15. The system of claim 10, wherein the client application includes a pluggable token provider component for each web service, the token provider components and web services being one of: statically bound and dynamically bound.

16. A computer storage device with instructions stored thereon for employing message level authentication across multiple web services through a pluggable token provider model, the instructions comprising:
receiving a payload of a web service call to be made from a web service component of a client application;
extracting a base identifier of the call;
calling into a meta data model component requesting web service metadata;
upon retrieval of the metadata, cycling thorough available bindings in the metadata, wherein the available bindings in the metadata includes at least one from a set of: a resource identifier against which the web service request is to be made, operation and action information to be included in a web service message, an authentication type supported by the resource, security policy information corresponding to the resource, and a token provider identification based on a token issuer identifier in the security policy;
selecting an appropriate binding based on a requested operation and an authentication type depending on a credential associated with the requested web service; and
fetching a token associated with the credential such that an actual web service request is constructed.

17. The computer storage device of claim 16, further comprising:
processing the metadata for retrieving tokens on a per web service basis; and
parsing the metadata to generate bindings that include at least one from a set of: a resource identifier against which the web service request is to be made, operation and action information to be included in a web service message, an authentication type supported by the resource, security policy information corresponding to the resource, and a token provider identification based on a token issuer identifier in the security policy.

18. The computer storage device of claim 17, wherein the metadata is processed at a metadata model component per resource identifier such that an associated token provider is identified from security policy information associated with the requested web service.

19. The computer storage device of claim 16, wherein the calls between components of the client application are made employing Simple Object Access Protocol (SOAP).

* * * * *